(12) United States Patent
Kravchenko et al.

(10) Patent No.: US 7,427,576 B2
(45) Date of Patent: Sep. 23, 2008

(54) CONTINUOUS GLASS FIBER WITH IMPROVED THERMAL RESISTANCE

(75) Inventors: Iryna Kravchenko, Göttingen (DE); Tom Erickson, Perrysburg, OH (US)

(73) Assignee: DBW Fiber Neuhaus GmbH, Neuhaus A. Rennweg (DE)

( * ) Notice: Subject to any disclaimer, the term of this patent is extended or adjusted under 35 U.S.C. 154(b) by 821 days.

(21) Appl. No.: 10/498,201

(22) PCT Filed: Dec. 4, 2002

(86) PCT No.: PCT/DE02/04485

§ 371 (c)(1), (2), (4) Date: Jan. 14, 2005

(87) PCT Pub. No.: WO03/050049

PCT Pub. Date: Jun. 19, 2003

(65) Prior Publication Data

US 2005/0130825 A1 Jun. 16, 2005

(30) Foreign Application Priority Data

Dec. 7, 2001 (DE) .................................. 101 61 791

(51) Int. Cl.
*C03C 13/02* (2006.01)
*C03C 13/06* (2006.01)
(52) U.S. Cl. ............................ 501/38; 501/35; 501/70
(58) Field of Classification Search .................... 501/35, 501/36, 38, 70
See application file for complete search history.

(56) References Cited

U.S. PATENT DOCUMENTS

| 3,847,626 | A | * | 11/1974 | Erickson et al. | ............... 501/38 |
| 3,847,627 | A | * | 11/1974 | Erickson et al | ............... 501/38 |
| 3,876,481 | A | * | 4/1975 | Erickson et al. | ............... 501/38 |
| 4,026,715 | A | * | 5/1977 | Erickson et al. | ............... 501/38 |
| 4,542,106 | A | * | 9/1985 | Sproull | ........................ 501/38 |
| 5,789,329 | A | * | 8/1998 | Eastes et al. | .................. 501/36 |
| 6,458,436 | B1 | * | 10/2002 | Hansen et al. | ............. 428/34.5 |
| 6,818,575 | B2 | * | 11/2004 | Wallenberger | ............... 501/35 |
| 2003/0224922 | A1 | * | 12/2003 | Wallenberger | ............... 501/35 |

FOREIGN PATENT DOCUMENTS

| EP | 0 832 046 B1 | 5/2000 |
| GB | 1 391 384 | 4/1975 |

* cited by examiner

*Primary Examiner*—Jerry Lorengo
*Assistant Examiner*—Elizabeth A Bolden
(74) *Attorney, Agent, or Firm*—Akerman Senterfitt; Gregory A. Nelson; Gregory M. Lefkowitz

(57) ABSTRACT

The invention relates to a glass fiber, especially a continuous glass fiber, exhibiting improved thermal behavior. According to the invention, the glass fiber consists of $SiO_2$ 56.0 62.0%, $Al_2O_3$ 11.0-15.0%, CaO 20.0-24.5%, $TiO_2$ 2.0 3.2%, MgO 0.2 0.4%, $Na_2O$ 0.05 0.2%, $K_2O$ 0 0.25%, $Fe_2O_3$ 0.11 0.3%, $SO_3$ 0.01 0.05%. The retraction value of the fiber is less than 20% at 800° C. and/or less than 80% at 850°. The inventive fiber is produced according to a method wherein the difference between the glass melt liquidus temperature and the fiber formation temperature is the same as or great than 95° C. The fiber can be used as filling material in sound absorbers for waste gases, in the production of shaped bodies and in the production of nets, fabrics or knitted fabrics.

14 Claims, 1 Drawing Sheet

US 7,427,576 B2

CONTINUOUS GLASS FIBER WITH IMPROVED THERMAL RESISTANCE

CROSS REFERENCE TO RELATED APPLICATION

This application is a national stage of PCT/DE02/04485 filed Dec. 4, 2002, which claims the priority of German Application DE 101 61 791.7 filed Dec. 7, 2001, under the International Convention.

FIELD OF THE INVENTION

The present invention relates to a glass fiber, particularly continuous glass fiber, exhibiting an improved thermal behavior.

BACKGROUND

From GB 1391384, glass fiber compositions based on calcium aluminosilicate glasses are known, which can also contain a number of additives. The fiber should be free from boron and fluoride in order to reduce production-related environmental burdens.

EP-B-832046 describes a boron-free continuous glass fiber with a similar base, wherein the composition has a viscosity of 1,000 poises at a deformation temperature of 1,149-1,371° C. and a liquidus temperature which is at least 38° C. below said deformation temperature.

SUMMARY OF THE INVENTION

The object of the invention is to develop a continuous glass fiber exhibiting an improved thermal behavior, particularly a continuous glass fiber with an improved shrinkage behavior.

According to the invention, a continuous glass fiber with improved thermal resistance is provided, which glass fiber is characterized in that it contains the following components (in % by weight and relative to the total weight)

| | |
|---|---|
| $SiO_2$ | 56.0 to 62.0 |
| $Al_2O_3$ | 11.0 to 20.0 |
| CaO | 20.0 to 25.0 |
| $TiO_2$ | 1.5 to 4.0 |
| MgO | 0.2 to 1.0 |
| $Na_2O$ | 0.05 to 2.0 |
| $K_2O$ | 0 to 2.0 |
| $Fe_2O_3$ | 0.1 to 0.3 |
| $SO_3$ | 0.01 to 0.05 | and in that the fiber's shrinkage is less than 20% at 800° C., less than 55% at 825° C. and less than 80% at 850° C., and which fiber is produced according to a method in which the liquidus temperature of the glass melt and the fiberizing temperature differ by at least 95° C.

The aforesaid glass components altogether make up 100%, wherein additional impurities can be contained, such as e.g. tiny amounts of $Cr_2O_3$ (below 0.01%) as well as small amounts of Co, Ni, Zn, Ce in the range of 0-0.5% by weight each.

It is preferred that the difference ($\Delta T$) between the glass compositions' liquidus temperature and fiberizing temperature (log 3) be more than 95° C., particularly at least 98° C., even more preferred at least 105° C. In general, $\Delta T$ ranges between 95 and 120° C., preferably 95 and 110° C.

The fiberizing temperature is the temperature of a glass melt at which the melt's viscosity is $10^3$ poises (Loewenstein, The Manufacturing Technology of Continuous Glass Fibres, Elsevier, 3rd ed. 1993). This means the viscosity of the glass melt according to an inventive composition is $10^3$ poises at 1,240° C. and above while the liquidus temperature is >915° C.

A big difference $\Delta T$ indicates a particularly high stability of the melt (Loewenstein, 1993). A low liquidus temperature (beginning of crystal nucleus formation as the melt cools down) also suggests stability of the composition as a glass. Since in the present case $\Delta T$ is at least 95° C., preferably more than 95° C., the melt is particularly stable.

It has been found that the shrinkage behavior of the glass fiber according to the invention depends on said $\Delta T$ and is not achieved if $\Delta T$ is below 95° C.

A preferred glass fiber contains 58 to 62% by weight $SiO_2$, particularly 57.0 to 58.8% by weight $SiO_2$.

Another preferred embodiment of the glass fibers according to the invention contains $SiO_2$ and in addition

| | |
|---|---|
| $Al_2O_3$ | 13-14 |
| CaO | 22-24.5 |
| $TiO_2$ | 2.5-3.9 |
| MgO | 0.2-0.3 |
| $Na_2O$ | 0.05-0.2 |
| $K_2O$ | 0.1-0.25 |
| $Fe_2O_3$ | 0.1-0.2 |
| $SO_3$ | 0.01-0.05. |

Another preferred embodiment of the glass fibers according to the invention contains

| | |
|---|---|
| $SiO_2$ | 57.0 to 58.8 |
| $Al_2O_3$ | 13.2 to 13.9 |
| CaO | 23.4 to 24.2 |
| $TiO_2$ | 2.8 to 3.2 |
| MgO | 0.2 to 0.4 |
| $Na_2O$ | 0.1 to 0.15 |
| $K_2O$ | 0.1 to 0.2 |
| $Fe_2O_3$ | 0.15 to 0.25 |
| $SO_3$ | 0.01 to 0.05 |

Another preferred embodiment contains the following components

| | |
|---|---|
| $SiO_2$ | 56.0 to 62.0 |
| $Al_2O_3$ | 11.0 to 15.0 |
| CaO | 20.0 to 24.5 |
| $TiO_2$ | 2.0 to 4.0 |
| MgO | 0.2 to 0.4 |
| $Na_2O$ | 0.05 to 0.2 |
| $K_2O$ | 0 to 0.25 |
| $Fe_2O_3$ | 0.11 to 0.3 |
| $SO_3$ | 0.01 to 0.05 | and the fiber's shrinkage is less than 20% at 800° C. and/or less than 55% at 825° C. and/or less than 80% at 850° C., and the fiber is produced according to a method in which the liquidus temperature of the glass melt and the fiberizing temperature differ by at least 95° C.

When compared to known, commercially available fibers, the glass composition according to the invention surprisingly exhibits an improved shrinkage behavior. In a shrinkage test as described below, the shrinkage value of the average fiber according to the invention is below that of the known Advantex@ fiber by approx. 15-20% at 800° C., approx. 7-10% at 825° C. and approx. 2-5% at 850° C.

The shrinkage behavior of a glass fiber under thermal stress is of particular importance if said fiber is to be used as filling material in a car's exhaust silencer. In this context, the temperature range between 800 and 850° C. is most relevant for the majority of engine types since in this range the medium exhaust temperatures are situated and the blow-out rate of worn fibers or fiber pieces is highest in impulse load situations (starting, accelerating).

An improved shrinkage behavior in this range means that sintering processes between the fibers are avoided, the fibers are less susceptible to crystallization, the fibers' elastic properties are maintained to a higher degree, blow-out rates are reduced and, as a result, the durability of silencer fillings is increased. Finally, the silencing effect is improved, particularly in cars with high mileage.

The shrinkage test is carried out as part of a method for determining the so called collapse point of glass fibers for use in silencers. A glass fiber roving is opened by means of compressed air. The glass fiber is formed into a downy glass fiber ball having a constant weight and diameter of e.g. 5 g and 50 mm. Several glass fiber balls of the same size are formed. The glass fiber balls are placed in a furnace at a temperature selected from the range between 600 and 1,000° C. in 25° C. increments for 30 min. A new glass fiber ball is introduced for each 25° C. increment. Once the glass fiber ball has been subjected to the respective temperature for 30 minutes, its change in height is measured and expressed in percent. The temperature at which the height of the glass fiber ball has reduced to 10% of its original height is referred to as collapse point. The shrinkage process is also recorded in order to throw light on the behavior of the fiber in the temperature range typical for a silencer.

If the shrinkage of continuous glass fibers used in silencer boxes is improved by 10-20% compared to the shrinkage values of known fibers in the range between 800 and 850° C., this is of enormous economic importance due to the improved silencing effect and the extension on the silencers' service life.

The glass fiber according to the invention can be produced by any conventional method for producing continuous glass fibers. The respective raw materials are melted in a furnace, and the homogeneous glass melt is introduced into a nozzle device for drawing glass fibers. The fibers are formed by drawing fibers by means of a coiling device and simultaneously solidification of the melt in the form of glass filaments of glass fibers.

A preferred method according to the invention consists in that the glass batch is melted in an oxidizing atmosphere and the difference between the liquidus temperature of the glass melt and the fiberizing temperature is adjusted to at least 95° C.

"Oxidizing atmosphere" means that the ratio of oxygen to exhaust gas ranges between 0.8 and 1.6.

The fiberizing temperature ranges between 1,240 and 1,350° C. This means the melt has a viscosity of $10^3$ poises at 1,240° C. and above, and the liquidus temperature is higher than 915° C. The glass melt's delta T value is at least 95° C., preferably more than 98° C. and particularly more than 105° C.

It has been found that an improved thermal behavior with regard to the fiber's shrinkage behavior can be achieved despite a very low MgO content of 0.2-0.4% by weight.

The continuous glass fiber according to the invention can be formed into a glass fiber roving and directly blown into the silencer according to a method known per se; it can also be directly blown into a net or a plastic bag.

In addition to the aforedescribed use as filling material in exhaust silencers, another characteristic of the invention consists in texturizing the roving and using it in the production of shaped bodies.

A special embodiment with regard to said use consists in that the glass fiber roving is used in a silencer in combination which ceramic fiber or ceramic paper (technical paper), wherein a central perforated pipe through which the exhaust gases flow is wrapped with ceramic fiber, the continuous glass fiber according to the invention is arranged around this inner shell in a disordered manner, and the outer shell is formed by an enclosed space having an exhaust outlet. Such an arrangement is generally described in EP 0692616 to which reference is made. The ceramic further increases the thermal resistance and improves the shrinkage behavior of the glass fiber.

Another special embodiment with regard to said use consists in that the glass fiber roving is used in a silencer in combination with steel wool, wherein a central perforated pipe through which the exhaust gases flow is wrapped with steel wool, the continuous glass fiber according to the invention is arranged around this inner shell in a disordered manner, and the outer shell is formed by an enclosed space having an exhaust outlet. In this way, the thermal resistance of the glass fiber is increased and its shrinkage behavior improved even further.

DETAILED DESCRIPTION OF PREFERRED EMBODIMENTS

Figure 1:
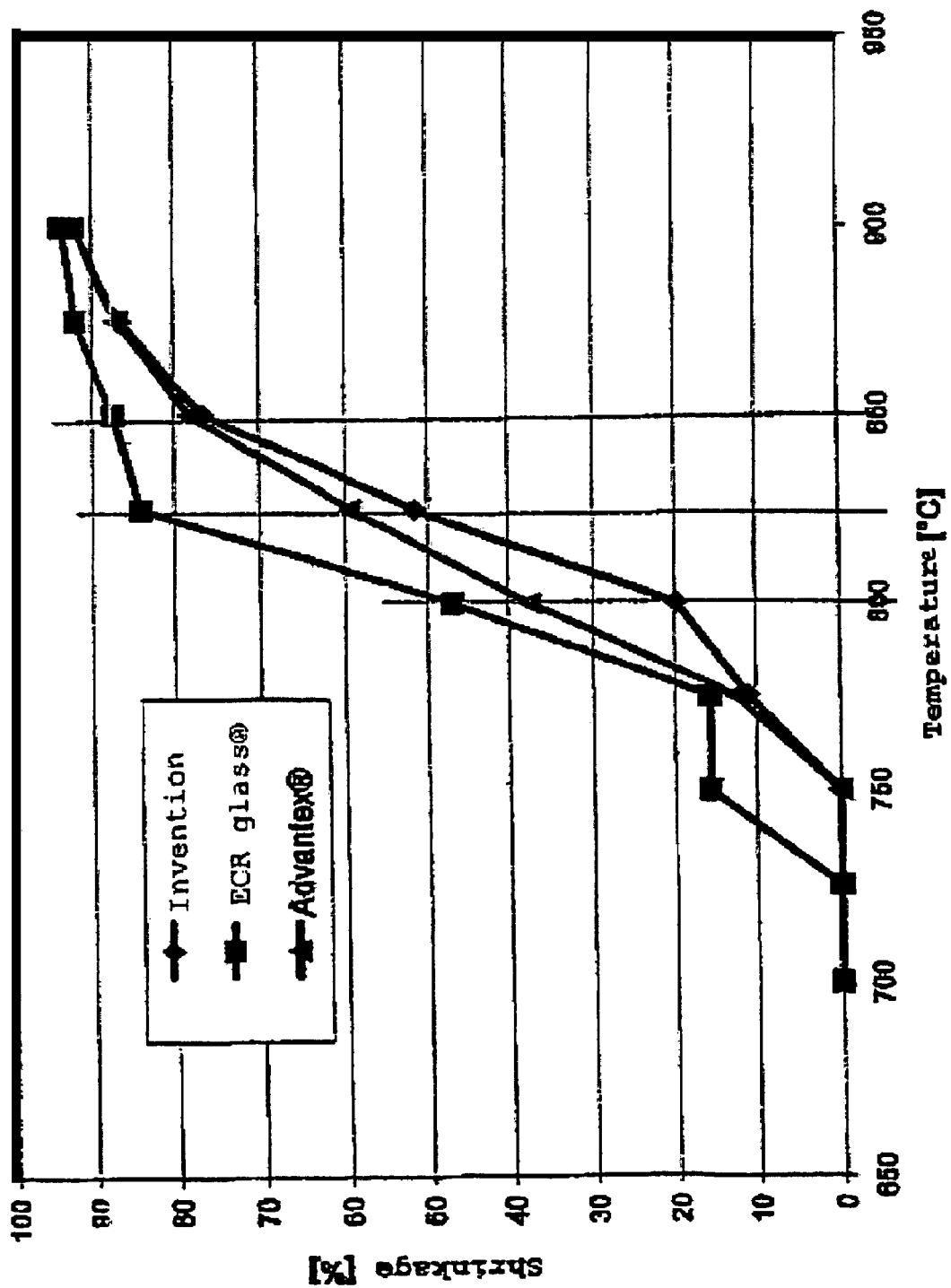
FIG. 1 is a diagram showing the shrinkage behavior of the fibers compared to known fibers.

The invention will now be explained in more detail by means of examples.

In a laboratory glass melting facility, a glass was produced which, according to an analysis, was composed as follows: 59.3% $SiO_2$, 12.9% $Al_2O_3$, 23.1% CaO, 3.2% $TiO_2$, 0.3% MgO, 0.05% $Na_2O$, 0.25% $K_2O$, 0.17% $Fe_2O_3$, 0.03% $SO_3$.

At a viscosity of $10^3$ poises, the temperature is 1,262° C.; the liquidus temperature is 1,155° C. and the difference between the liquidus and fiberizing temperatures ($\Delta T$) is 107° C. By means of a laboratory facility, in which a hole nozzle crucible made of a platinum-rhodium alloy is installed, fibers are drawn from said glass and combined into a roving. The glass was heated above its deformation temperature of 1,262° C., and the glass fibers were drawn each time the temperature had risen by 10° C. and a holding time of 30 min had passed. The fiber drawing temperatures ranged from 1,260 to 1,380° C. This means the aforedescribed composition ensures stability of the fiber drawing process over a range of more than 100° C.

According to the aforedescribed shrinkage test, the shrinkage behavior of the continuous glass fibers drawn was as follows: 18% at 800° C., 50% at 825° C., 75% at 850° C.

EXAMPLE 2

In a pilot plant, a glass fiber was produced which, according to an analysis, was composed as follows (in % by weight): 58.4 $SiO_2$, 13.4 $Al_2O_3$, 20.4 CaO, 0.34 MgO, 0.05 $Na_2O$, 0 $K_2O$, 3.5 $TiO_2$, 0.17 $Fe_2O_3$, 0.02 $SO_3$.

At a viscosity of $10^3$ poises, the temperature is 1,245° C.; the liquidus temperature is 1,150° C. and the difference between the liquidus and fiberizing temperatures is 95° C. The fiber roving formed from the fibers has a linear density of 1,128 tex and an average filament diameter of 24μ. The glass fiber roving is unraveled by means of a special texturizing machine using compressed air, and the shrinkage behavior of the glass fiber balls formed is analyzed according to the aforedescribed collapse point test. The fiber's shrinkage was found to be less than 17% at 800° C., less than 34% at 825° C. and less than 64% at 850° C. These results prove the stability of the glass fiber as the temperature increases within the temperature range in which the engines of the most frequent car models discharge their exhaust gases.

EXAMPLE 3

A glass fiber roving according to Example 2 is produced and unraveled by means of said texturizing machine. The unraveled fiber is filled into a silencer box through which a perforated pipe extends which is connected to the engine's exhaust system. Exhaust gases having a predetermined temperature are blown through said pipe at predetermined intervals. The fiber produced is subjected to the aforedescribed test at a temperature of 850° C. for 8 hours. The results show that the blow-out rate, i.e. the amount of fiber pieces blown out of the silencer, which are also referred to as blown-out material, is max. 0.5% by weight. After the test, the fiber's structure has hardly changed. The fibers still have the shape of the box and are undamaged. These results prove the extremely good durability of the silencer under extreme operating conditions.

The same test was carried out using a commercially available continuous glass fiber composed as follows: 58.8 $SiO_2$, 11.12 $Al_2O_3$, 22.66 CaO, 2.3 MgO, 0.27 $Na_2O$, 0.09 $K_2O$, 1.59 $TiO_2$, 0.23 $Fe_2O_3$.

The fiber's shrinkage was 47% at 800° C. and 83% at 825° C. At 825° C., the blow-out rate was 1.4%.

A comparison of the aforesaid values to those of the glass fiber according to Example 2 clearly demonstrates the improved thermal behavior of the continuous glass fiber according to the invention.

The invention claimed is:

1. A glass fiber with improved thermal resistance comprising the following components (in % by weight and relative to the total weight)

| | |
|---|---|
| $SiO_2$ | 56.0 to 62.0 |
| $Al_2O_3$ | 11.0 to 20.0 |
| CaO | 20.0 to 25.0 |
| $TiO_2$ | 1.5 to 4.0 |
| MgO | 0.2 to 1.0 |
| $Na_2O$ | 0.05 to 2.0 |
| $K_2O$ | 0 to 2.0 |
| $Fe_2O_3$ | 0.1 to 0.3 |
| $SO_3$ | 0.01 to 0.05 | which fiber has a shrinkage of less than 20% at 800° C. and/or less than 55% at 825° C. and/or less than 80% at 850° C., and is produced according to a method in which the liquidus temperature of the glass melt and the fiberizing temperature differ by at least 95° C.

2. A glass fiber according to claim 1, wherein $SiO_2$ is contained in an amount ranging between 58 and 62% by weight.

3. The glass fiber according to claim 1, wherein $SiO_2$ is contained in an amount ranging between 57.0 and 58.8% by weight.

4. The glass fiber according to claim 1, wherein said fiber comprises

| | |
|---|---|
| $SiO_2$ | 56.0-62.0 |
| $Al_2O_3$ | 13-14 |
| $SiO_2$ | 56.0-62.0 |
| CaO | 22-24.5 |
| $TiO_2$ | 2.5-3.9 |
| MgO | 0.2-0.3 |
| $Na_2O$ | 0.05-0.2 |
| $K_2O$ | 0.1-0.25 |
| $Fe_2O_3$ | 0.1-0.2 |
| $SO_3$ | 0.01-0.05. |

5. The glass fiber according to claim 1, wherein said fiber has a shrinkage of less than 18% at 800° C. and/or less than 52% at 825° C.

6. The glass fiber according to claim 1, wherein said liquidus temperature and deformation temperature differ by at least 98° C., preferably at least 100° C.

7. The glass fiber according to claim 1, wherein said fiber comprises the following components:

| | |
|---|---|
| $SiO_2$ | 57.0 to 58.8 |
| $Al_2O_3$ | 13.2 to 13.9 |
| CaO | 23.4 to 24.2 |
| $TiO_2$ | 2.8 to 3.2 |
| MgO | 0.2 to 0.4 |
| $Na_2O$ | 0.1 to 0.15 |
| $K_2O$ | 0.1 to 0.2 |
| $Fe_2O_3$ | 0.15 to 0.25 |
| $SO_3$ | 0.01 to 0.05. |

8. The glass fiber according to claim 1, wherein said fiber comprises the following components:

| | |
|---|---|
| $SiO_2$ | 58.0 to 62.0 |
| $Al_2O_3$ | 13.0 to 14.0 |
| CaO | 22.0 to 25.0 |
| $TiO_2$ | 2.5 to 4.0 |
| MgO | 0.2 to 0.3 |
| $Na_2O$ | 0.05 to 0.2 |
| $K_2O$ | 0 to 0.2 |
| $Fe_2O_3$ | 0.1 to 0.2 |
| $SO_3$ | 0.01 to 0.03 | and wherein said fiber has a shrinkage of less than 18% at 800° C., less than 35% at 825° C. and less than 65% at 850° C.

9. A filling material for an exhaust silencer, said filling material comprising the fibers according to claim 1, wherein said fibers have a shrinkage of less than 20% at 800° C., less than 40% at 825° C. and less than 75% at 850° C.

10. The filling material according to claim 9, further comprising ceramic paper, wherein a central perforated pipe through which the exhaust gases flow is wrapped with ceramic fiber, the continuous glass fiber is arranged around this inner shell in a disordered manner, and the outer shell is formed by an enclosed space having an exhaust outlet.

11. The filling material according to claim 9, further comprising steel wool, wherein a central perforated pipe through which the exhaust gases flow is wrapped with said steel wool, the continuous glass fiber is arranged around this inner shell in a disordered manner, and the outer shell is formed by an enclosed space having an exhaust outlet.

12. A method for producing a glass fiber according to claim 1, which method comprises the steps of melting a glass batch, introducing the melt into a nozzle device and drawing the fiber out of said nozzle device, wherein said glass batch is melted in an oxidizing atmosphere and the difference between the liquidus temperature of the glass melt and the fiberizing temperature is adjusted to at least 95° C.

13. The glass fiber with improved thermal resistance according to claim 1, wherein said fiber contains the following components (in % by weight and relative to the total weight)

| | |
|---|---|
| $SiO_2$ | 56.0 to 62.0 |
| $Al_2O_3$ | 11.0 to 15.0 |
| CaO | 20.0 to 24.5 |
| $TiO_2$ | 2.0 to 4.0 |
| MgO | 0.2 to 1.0 |
| $Na_2O$ | 0.05 to 2.0 |
| $K_2O$ | 0 to 0.25 |
| $Fe_2O_3$ | 0.11 to 0.3 |
| $SO_3$ | 0.01 to 0.05 | and wherein said fiber has a shrinkage of less than 20% at 800° C. and/or less than 55% at 825° C. and/or less than 80% at 850° C., and is produced according to a method in which the liquidus temperature of the glass melt and the fiberizing temperature differ by at least 95° C.

14. A shaped body, net, woven fabric or knitted fabric comprising the fibers according to claim 1, wherein said fibers have a shrinkage of less than 20% at 800° C., less than 40% at 825° C. and less than 75% at 850° C.

* * * * *